United States Patent
Sakayanagi

(10) Patent No.: US 12,533,983 B2
(45) Date of Patent: Jan. 27, 2026

(54) CHARGE CONTROL DEVICE

(71) Applicant: TOYOTA JIDOSHA KABUSHIKI KAISHA, Toyota (JP)

(72) Inventor: Yoshihiro Sakayanagi, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 371 days.

(21) Appl. No.: 18/373,871

(22) Filed: Sep. 27, 2023

(65) Prior Publication Data
US 2024/0140252 A1 May 2, 2024

(30) Foreign Application Priority Data
Oct. 27, 2022 (JP) ................. 2022-172742

(51) Int. Cl.
*B60L 53/67* (2019.01)
*B60L 53/62* (2019.01)
*B60L 53/66* (2019.01)

(52) U.S. Cl.
CPC ............... *B60L 53/67* (2019.02); *B60L 53/62* (2019.02); *B60L 53/66* (2019.02)

(58) Field of Classification Search
CPC ........................................................ B60L 53/67
USPC .......................................................... 700/295
See application file for complete search history.

(56) References Cited

U.S. PATENT DOCUMENTS

| | | | | |
|---|---|---|---|---|
| 11,919,417 B2* | 3/2024 | Heyne | | B60L 53/66 |
| 12,337,717 B2* | 6/2025 | Mun | | B60L 53/11 |
| 2013/0304272 A1* | 11/2013 | Schaut | | H02J 13/00028 |
| | | | | 700/295 |
| 2013/0310999 A1* | 11/2013 | Baxter | | B60L 55/00 |
| | | | | 700/295 |
| 2014/0021917 A1* | 1/2014 | Paupert | | B60L 53/305 |
| | | | | 320/109 |
| 2014/0062401 A1* | 3/2014 | Gadh | | B60L 53/67 |
| | | | | 320/109 |
| 2017/0182900 A1* | 6/2017 | Ohkuma | | B60L 53/50 |
| 2023/0039202 A1* | 2/2023 | Kim | | B60L 53/68 |
| 2023/0116469 A1* | 4/2023 | Hau | | B60L 53/66 |
| | | | | 320/109 |

(Continued)

FOREIGN PATENT DOCUMENTS

| | | |
|---|---|---|
| JP | 3830095 B2 | 10/2006 |
| JP | 2016-171620 A | 9/2016 |

OTHER PUBLICATIONS

Matsujiro Urushibata; "About Current Balancing Device for Three-Phase-Circuit"; The Journal of the Institute of Electrical Engineers of Japan; 1962; vol. 82; No. 885; pp. 921-930.

(Continued)

*Primary Examiner* — Travis R Hunnings
(74) *Attorney, Agent, or Firm* — Oliff PLC

(57) ABSTRACT

A charge control device includes a processor configured to: acquire a delivery scheduled time of a vehicle and an amount of charge of a rechargeable battery when the vehicle including the rechargeable battery is connected to any one of a plurality of chargers of a single phase, each of the plurality of chargers being connected to each phase of the three-phase alternating current; and control the any one of the plurality of chargers such that the three-phase alternating current is balanced according to the delivery scheduled time and the amount of charge.

5 Claims, 7 Drawing Sheets

(56) References Cited

U.S. PATENT DOCUMENTS

2025/0010755 A1\* 1/2025 Mun ..................... B60L 53/67
2025/0326323 A1\* 10/2025 Baron ................... B60L 53/68
2025/0332944 A1\* 10/2025 Solon ................... H02J 7/0013

OTHER PUBLICATIONS

Koki Matsuse; "Fundamental Study on a Method of Balancing Currents of Unbalanced Three Phase System using Thyristor Negative-Sequence Current Source"; Memoirs of the Institute of Sciences and Technology, Meiji University; 1976; vol. 15;. No. 7; pp. 7-1 to 7-18.

\* cited by examiner

|  |  | 8 O'CLOCK | 9 O'CLOCK | 10 O'CLOCK | 11 O'CLOCK | 12 O'CLOCK | 13 O'CLOCK | 14 O'CLOCK | 15 O'CLOCK | 16 O'CLOCK | 17 O'CLOCK | 18 O'CLOCK | 19 O'CLOCK | 20 O'CLOCK |
|---|---|---|---|---|---|---|---|---|---|---|---|---|---|---|
| U-PHASE | CHARGER A |  | ░ | ░ |  |  |  |  |  |  |  |  |  |  |
|  | CHARGER B |  |  | ░ | CHARGING | CHARGING |  |  |  |  |  |  |  |  |
|  | CHARGER C |  |  | ░ | ░ | ░ | CHARGING | ░ | ░ | ░ |  |  |  |  |
| V-PHASE | CHARGER D |  |  |  | CHARGING | ░ | CHARGING |  |  |  |  |  |  |  |
|  | CHARGER E |  |  |  |  | CHARGING |  | ░ | ░ | ░ |  |  |  |  |
|  | CHARGER F |  |  |  | CHARGING | ░ | CHARGING |  |  |  |  |  |  |  |
| W-PHASE | CHARGER G |  |  |  | CHARGING | ░ | CHARGING | ░ | ░ | ░ |  |  |  |  |
|  | CHARGER H |  |  |  |  | CHARGING | ░ |  |  |  |  |  |  |  |
|  | CHARGER I |  |  |  |  | CHARGING |  |  |  |  |  |  |  |  |

T21:

| CORRELATIONAL IMBALANCE | U | 6 | 6 | 6 |
|---|---|---|---|---|
|  | V | 6 | 6 | 6 |
|  | W | 6 | 6 | 6 |

| | | 8 O'CLOCK | 9 O'CLOCK | 10 O'CLOCK | 11 O'CLOCK | 12 O'CLOCK | 13 O'CLOCK | 14 O'CLOCK | 15 O'CLOCK | 16 O'CLOCK | 17 O'CLOCK | 18 O'CLOCK | 19 O'CLOCK | 20 O'CLOCK |
|---|---|---|---|---|---|---|---|---|---|---|---|---|---|---|
| U-PHASE | CHARGER A | | ░ | ░ | ░ | CHARG-ING | ░ | | | | | | | |
| | CHARGER B | | | | | | | | | | | | | |
| | CHARGER C | | | | | | | | | | | | | |
| V-PHASE | CHARGER D | | | | | | | | | | | | | |
| | CHARGER E | | | | ░ | CHARG-ING | ░ | | | | | | | |
| | CHARGER F | | | | | | | | | | | | | |
| W-PHASE | CHARGER G | | | | | | | | | | | | | |
| | CHARGER H | | | | | | | | | | | | | |
| | CHARGER I | | | | | CHARG-ING | ░ | ░ | ░ | ░ | | | | |

T23:

| | | | | | | |
|---|---|---|---|---|---|---|
| | U | 0 | 0 | 0 | 6 | 0 |
| CORRELA-TIONAL IMBALANCE | V | 0 | 0 | 0 | 6 | 0 |
| | W | 0 | 0 | 0 | 6 | 0 |

CHARGE CONTROL DEVICE

The present application claims priority to and incorporates by reference the entire contents of Japanese Patent Application No. 2022-172742 filed in Japan on Oct. 27, 2022.

BACKGROUND

The present disclosure relates to a charge control device.

It is undesirable to occur correlation unbalance in which bias occurs in loads of the W-phase, U-phase and V-phase when transmitting power from a power system by three-phase alternating current because load in a substation is increased and transmission efficiency is also lowered. JP 2016-171620 discloses a control device for suppressing the occurrence of correlation unbalance by controlling the load on a customer side.

SUMMARY

Incidentally, when charging a vehicle having a battery, various vehicles are connected to a charger. Since the load of the customer side is required to be controllable, it is difficult to apply the technique of JP 2016-171620 to the charging of vehicles.

FIG. 7 is a diagram illustrating a state in which a known charging control device controls the charging start time and the charging end time of each charger. In the example of FIG. 7, it is assumed that chargers A to C, D to F, and G to I are connected to the U-phase, V-phase, and W-phase of the three-phase alternating current, respectively, and vehicles equipped with batteries are sequentially connected to the chargers A to I, and the batteries are charged. In the table T16, the time when the car is connected to the chargers A to I is indicated by the hatching of the dots, and the time when the charge is performed is indicated by the hatching of the diagonal lines.

The known charging control devices cause the chargers A to I to start charging in the order in which the vehicles are connected. 6 kW power is required to charge the vehicles, and if chargers A to C charge the vehicles between 9 o'clock and 10 o'clock, as shown in the table T26, only the U-phase is loaded with 18 kW, causing correlated imbalance to occur.

There is a need for a charge control device capable of preventing the correlation unbalance occurs when charging a vehicle having a battery.

According to one aspect of the present disclosure, there is provided charge control device including a processor configured to: acquire a delivery scheduled time of a vehicle and an amount of charge of a rechargeable battery when the vehicle including the rechargeable battery is connected to any one of a plurality of chargers of a single phase, each of the plurality of chargers being connected to each phase of the three-phase alternating current; and control the any one of the plurality of chargers such that the three-phase alternating current is balanced according to the delivery scheduled time and the amount of charge.

BRIEF DESCRIPTION OF THE DRAWINGS

FIG. 2 is a diagram illustrating a state in which the charging control device according to the embodiment controls the charging start time and the charging end time of each charger;

FIG. 4 is a diagram illustrating a state in which the charging control device according to the second modification controls the charging start time and the charging end time of each charger;

DETAILED DESCRIPTION

A charge control device according to an embodiment of the present disclosure will be described with reference to the drawings. In addition, components in the following embodiment include those which can be substituted and easily by those skilled in the art, or those which are substantially the same.

Figure 1:
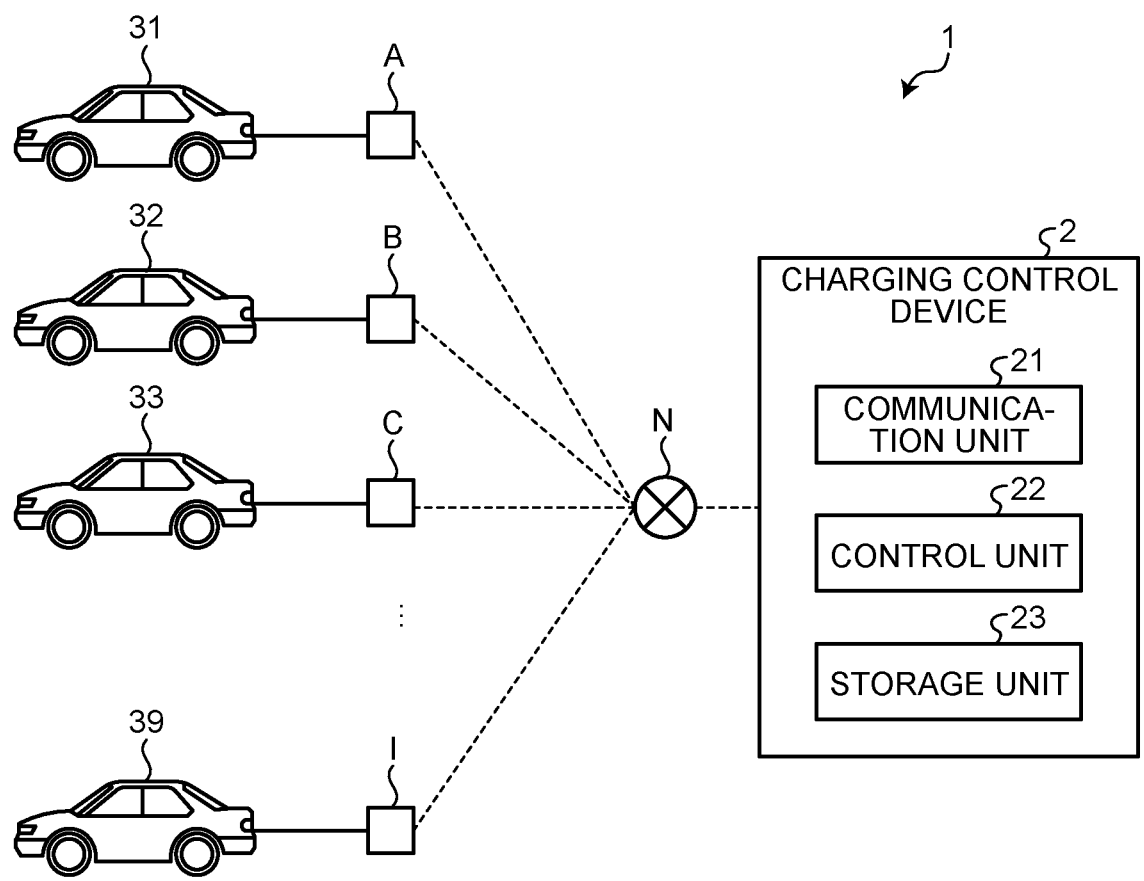
FIG. 1 is a schematic configuration diagram of a charging system according to an embodiment.

FIG. 1 is a schematic configuration diagram of a charging system according to the embodiment. A charging system 1 illustrated in FIG. 1 includes a charging control device 2, a plurality of chargers A-I, and vehicles 31-39 connected to the chargers A-I, respectively. The charger and the vehicle may be a plurality, and the number is not particularly limited. The charging control device 2 and the chargers A to I are each enabled to communicate via the network N. The network N is composed of, for example, the Internet, a mobile phone line network or the like.

The charge controller 2 is configured using a server or the like, to control charging from the chargers A-I to the vehicles 31-39.

The chargers A-I are connected to any of U-phase, V-phase, and W-phase of the three-phase alternating current, and supply power from the power system to batteries mounted on the vehicles 31-39. However, the chargers A-I may be connected either between UV, between VW or between WU of the three-phase alternating current. In addition, the chargers A to I may have a function of supplying the power discharged by the battery of the vehicle 31 to the power system. The charger A, under the control of the charging control device 2, when the vehicle 31 is connected, may be configured to obtain the delivery scheduled time and state of charge (SoC), and output the acquired delivery scheduled time and the SoC to the charging control device 2. The chargers B to I may also have the same configuration as the charger A.

The vehicle 31 is a vehicle having a rechargeable battery, is realized using either a hybrid electric vehicle (HEV), a plug-in hybrid electric vehicle (PHEV), or a battery electric vehicle (BEV). The vehicle 31 may be communicable with the charge control device 2 via the network N. The vehicles 32-39 may also have a similar configuration to the vehicle 31.

The charging control device 2 includes a communication unit 21, a control unit 22, and a storage unit 23.

The communication unit 21, under the control of the control unit 22, transmits various information to the chargers A to I via the network N and receives various information from the chargers A to I. Specifically, the communication unit 21, under the control of the control unit 22, receives the scheduled delivery time and SoC of the vehicles 31. The communication unit 21 is configured by using a communication module or the like capable of transmitting and receiving various information. The communication unit 21 may be capable of communicating with the vehicles 31 to 39 through the network N.

The control unit 22 is constituted by using a memory and a processor having hardware such as a CPU, and the control unit 22 reads and executes the program recorded in the storage unit 23 in the work area of the memory, and controls the components and the like through execution of the program by the processor. Thus, the control unit 22 cooperates with the hardware and software to realize a function module that matches a predetermined purpose. The control unit 22 controls the chargers A-I to make the three-phase alternating current be balanced in accordance with the delivery scheduled time and the SoC of the battery of the vehicles 31-39 received by the communication unit 21 from the chargers A-I. Specifically, the control unit 22, in accordance with the delivery scheduled time and the SoC, determines a charging starting time and a charging ending time of each of the respective chargers A-I.

The storage unit 23 stores various programs that the storage unit 23 executes. Further, the storage unit 23 stores the SoC of the battery and the delivery scheduled time of the vehicles 31 to 39 received by the communication unit 21 from the chargers A to I.

Figure 7:
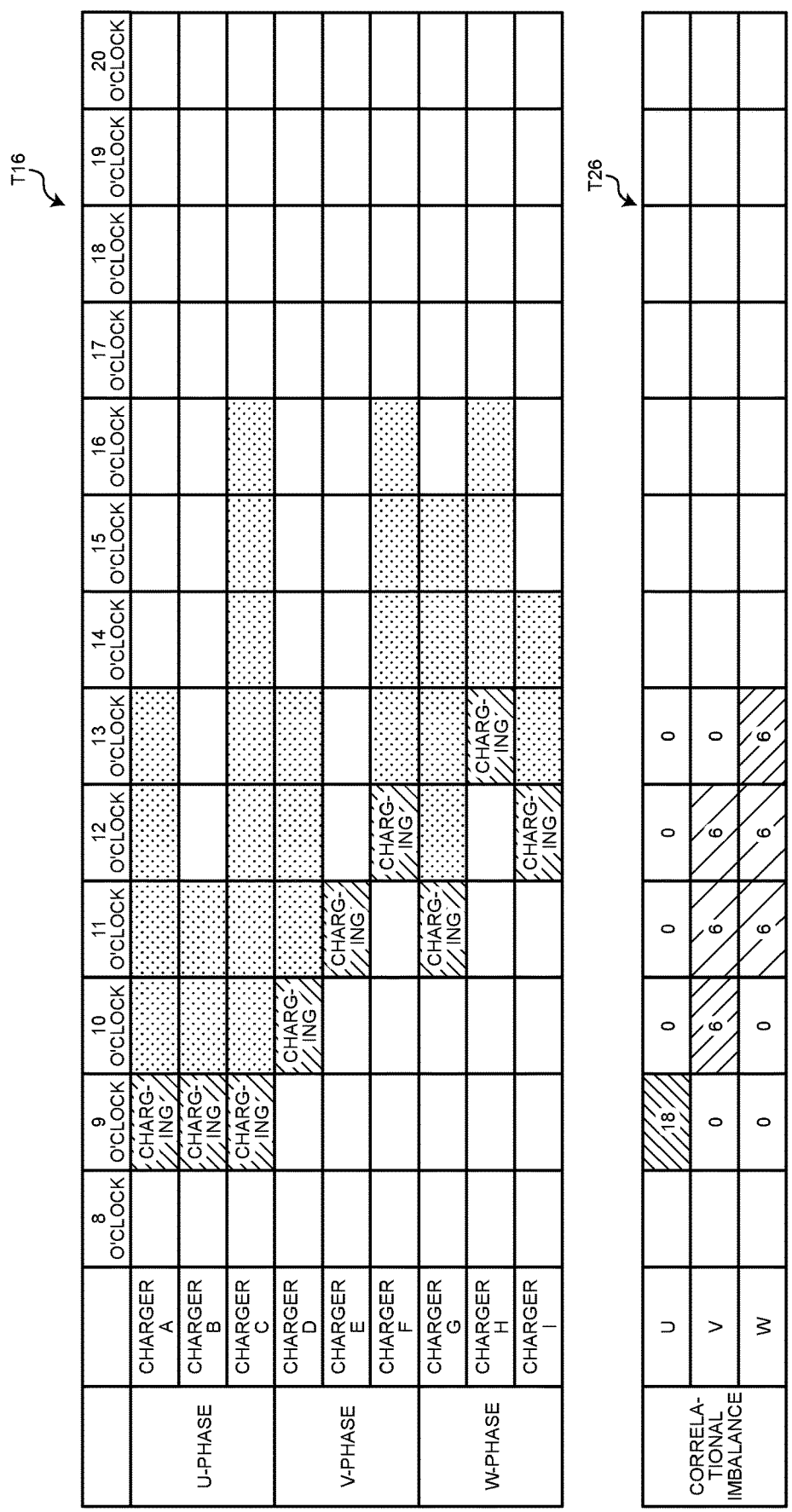
FIG. 7 is a diagram illustrating a state in which the known charging control device controls the charging start time and the charging end time of each charger.

Next, a process that the charge control device 2 executes is explained. FIG. 2 is a diagram illustrating a state in which the charging control device according to the embodiment controls the charging start time and the charging end time of each charger. In the example of FIG. 2, similarly to FIG. 7, it is assumed that the chargers A to C, D to F, and G to I are connected to the U-phase, V-phase, and W-phase of the three-phase alternating current, respectively, and the vehicles 31 to 39 in which the batteries are sequentially mounted are connected to the chargers A to I, and the batteries are charged. In the table T11 of FIG. 2, similarly to the table T16, the time when the vehicles are connected to the chargers A to I is indicated by hatching of dots, and the time when charging is performed is indicated by hatching of diagonal lines.

The charge control device 2 determines the charging starting time and the charging end time of each of the chargers A-I in accordance with the delivery scheduled time and the SoC such that the three-phase alternating current is balanced. When the power of 6 kW is necessary for charging the vehicles, the control unit 22 determines, as shown in the table T21 of FIG. 2, the charge starting time and the charging ending time of each of the chargers A-I such that load of 6 Kw is applied to each of the U-phase, V-phase and W-phase.

Specifically, if it is possible for the charge control device 2 to acquire the scheduled times of storage of the vehicles 31-39, the charge control device 2 determines the charging starting times and the charging end times of the chargers A-I illustrated in FIG. 2 in advance in accordance with the scheduled times of storage and the delivery times and the SoC.

According to the embodiment described above, the charger A-I is controlled such that the three-phase alternating current is balanced; therefore, it is possible to prevent the correlation unbalance from occurring when charging a vehicle having a battery.

If the charge control device 2 may not acquire the scheduled times of storage of the vehicles 31 to 39, the charge control device 2 performs appropriate determination each time the vehicles 31 to 39 are connected to the chargers A to I.

Figure 3:
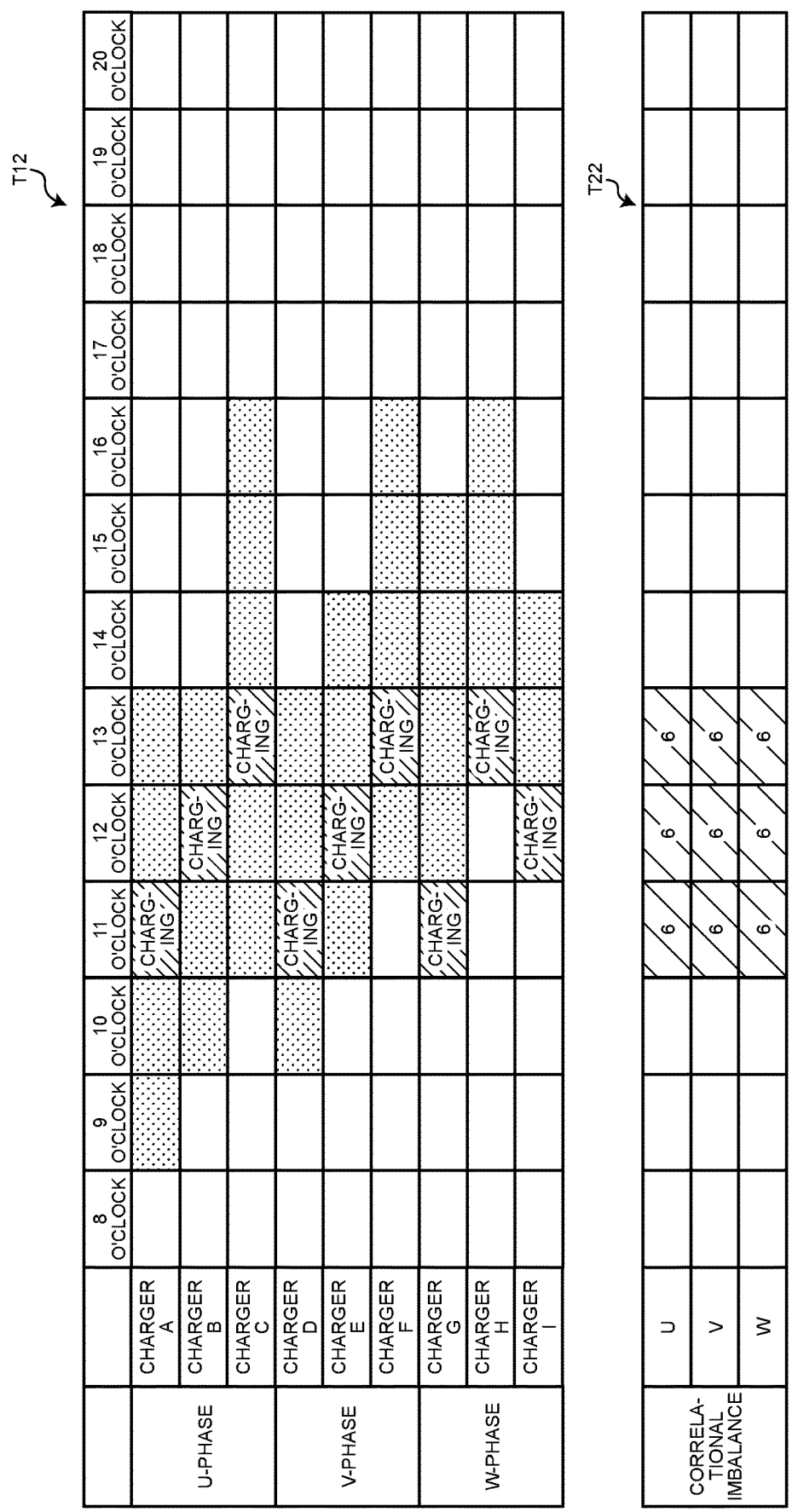
FIG. 3 is a diagram illustrating a state in which the charging control device according to the first modification controls the charging start time and the charging end time of each charger.

FIG. 3 is a diagram illustrating a state in which the charging control device according to the first modification controls the charging start time and the charging end time of each charger. As shown in the table T12 of FIG. 3, the charge control device 2 stands by without starting the charging even if the vehicle is connected to the charger A at 9 o'clock. At this time, the standby time shall be up to the time obtained by subtracting the time necessary for charging from the delivery scheduled time. This is to prevent the charging is not completed at the delivery scheduled time. Similarly, it stands by without starting charging even if the vehicles are connected to the chargers B and D at 10 o'clock.

Then, the vehicle is connected to the charger C at 11 o'clock, and the vehicles are connected to the chargers E and G, the charging control device 2 starts the charging using the charger A that has the earliest delivery scheduled time in the U-phase, the charger D that has the earliest delivery scheduled time in the V-phase, and the charger G. As a consequence, as shown in the table T22 of FIG. 3, the load of 6 kW is applied to each of the U-phase, the V-phase and the W-phase between 11 o'clock and 12 o'clock, and it is possible to prevent the correlational imbalance from occurring.

Subsequently, when the vehicles are connected to the chargers F and I at 12 o'clock, the charging control device 2 starts the charging of the vehicles of which the charging has not been completed using the charger B that has the earlier delivery scheduled time in the U-phase, the charger E that has the earlier delivery scheduled time in the V-phase and the charger I. Consequently, the load of 6 kW is applied to each of the U-phase, the V-phase and the W-phase between 12 o'clock and 13 o'clock, it is possible to prevent the correlational imbalance from occurring.

Furthermore, when the vehicle is connected to the charger H at 13 o'clock, the charging control device 2 starts charging the charger C and the charger F and the charger H that have not completed the charging. Consequently, the load of 6 kW is applied to each of the U-phase, the V-phase and the W-phase between 13 o'clock and 14 o'clock, it is possible to prevent the correlational imbalance from occurring.

According to the first modification described above, the chargers A-I are controlled such that the three-phase alternating current is balanced, and therefore, it is possible to prevent the correlation unbalance is occurred in the case of supplying power to an arbitrary load.

The charge controller 2 may determine the chargers A-I connecting the vehicles 31-39 such that the three-phase alternating current is balanced and guide the vehicles 31-39 to the determined chargers A-I.

FIG. 4 is a diagram illustrating a state in which the charging control device according to the second modification controls the charging start time and the charging end time of each charger. As shown in the table T13 of FIG. 4, the charge control device 2 guides the first incoming vehicle to the charger A of the U-phase, the second incoming vehicle to the charger E of the V-phase, and the third incoming vehicle to the charger I of the W-phase.

Here, if the three vehicles of the conditions illustrated in FIG. 4 are disproportionately connected to the charger of one of the phases, it is impossible to charge the vehicles by avoiding the correlation unbalance. However, according to the charge control device 2, by guiding the vehicle, the three-phase alternating current becomes balanced as shown in the table T23 of FIG. 4, and it is possible to prevent the correlation unbalance.

In the second modification, the method of guiding the vehicle by the charging control device 2 is not limited. The charging control device 2, for example, may guide each vehicle by the guidance system of the parking lot. Further, the charge control device 2 may guide each vehicle by switching the display of the connection possible/connection impossible in each charger.

Further, because vehicles are often tend to be parked from the vicinity of the entrance or the staircase to the facility, the charger of the U-phase, the charger of the V-phase and the charger of the W-phase may be repeatedly arranged in this order from a position which is likely to be occupied at first in order to connect the vehicle equally to the charger of each phase.

The charge control device 2 may include a communication unit 21 capable of communicating with the vehicles 31 to 39 through the network N, and when the communication unit 21 receives a connection request from the vehicles 31 to 39 to the chargers A to I, the control unit 22 may acquire SoC from the vehicles outputting the connection request.

Figure 5:
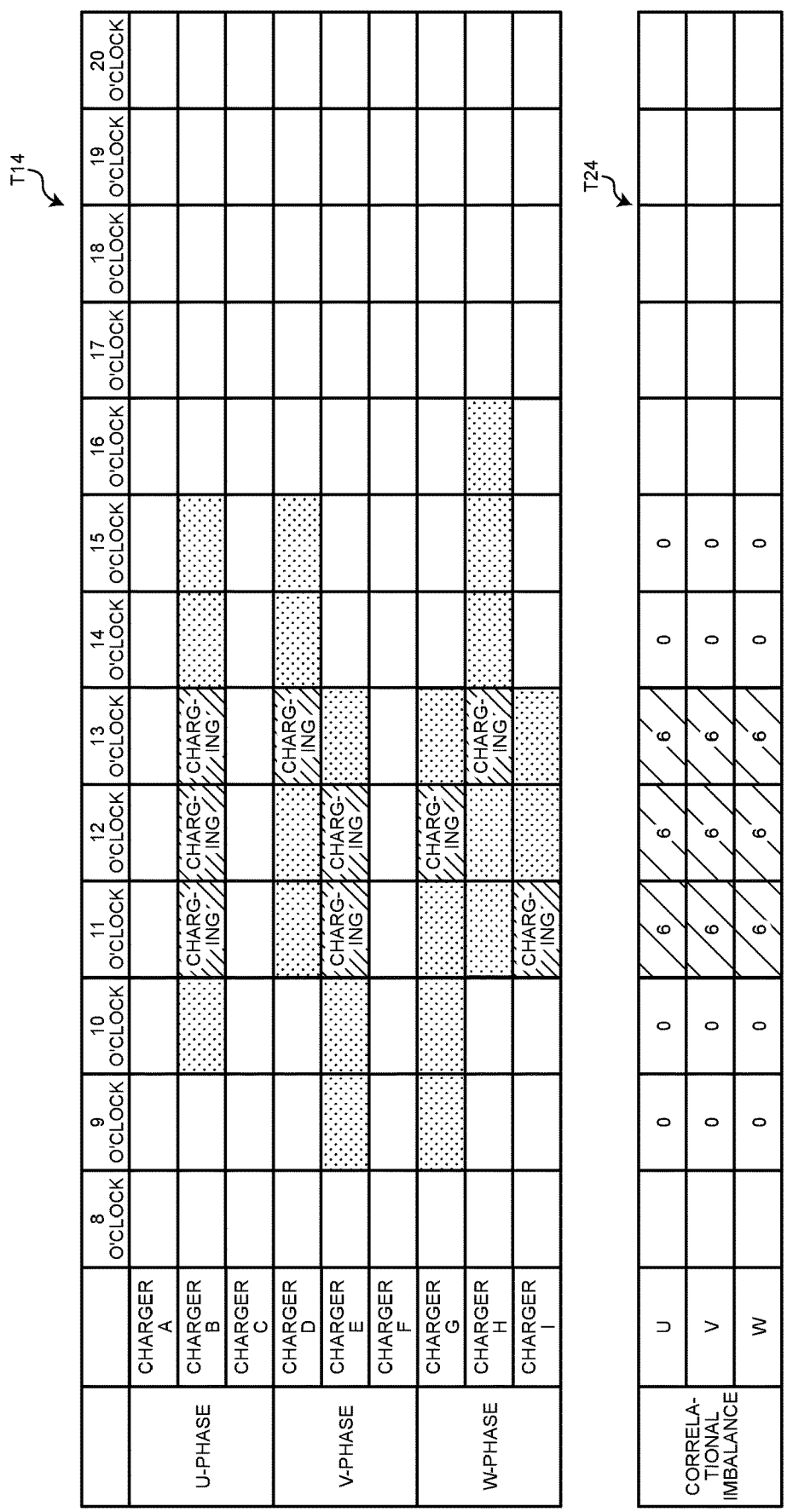
FIG. 5 is a diagram illustrating a state in which the charging control device according to the third modification controls the charging start time and the charging end time of each charger.

FIG. 5 is a diagram illustrating a state in which the charging control device according to the third modification controls the charging start time and the charging end time of each charger. The charge control device 2 calculates the time required for charging based on the SoC acquired from each of the vehicles, and guides each of the vehicles to any of the chargers A to I such that each of the vehicles is finished charging by the delivery scheduled time. In the table T14 of FIG. 5, the vehicle required for three hours to charge is guided to the charger B of the U-phase, and then the vehicle required for two hours to charge is guided to the charger E of the V-phase. Consequently, even when the charge amounts of the vehicles differ, as shown in the table T24 of FIG. 5, it is possible to prevent the correlated unbalance from occurring.

The charging control device 2 may control the charging and the discharging of the chargers A-I, depending on the delivery scheduled time and the charge amount, such that the three-phase alternating current is balanced. The discharging from the vehicle's battery means supplying power from the battery to the power system. In addition, if any of the chargers A to I are capable of rapid charging, for example, the amount of charge per unit time is large.

Figure 6:
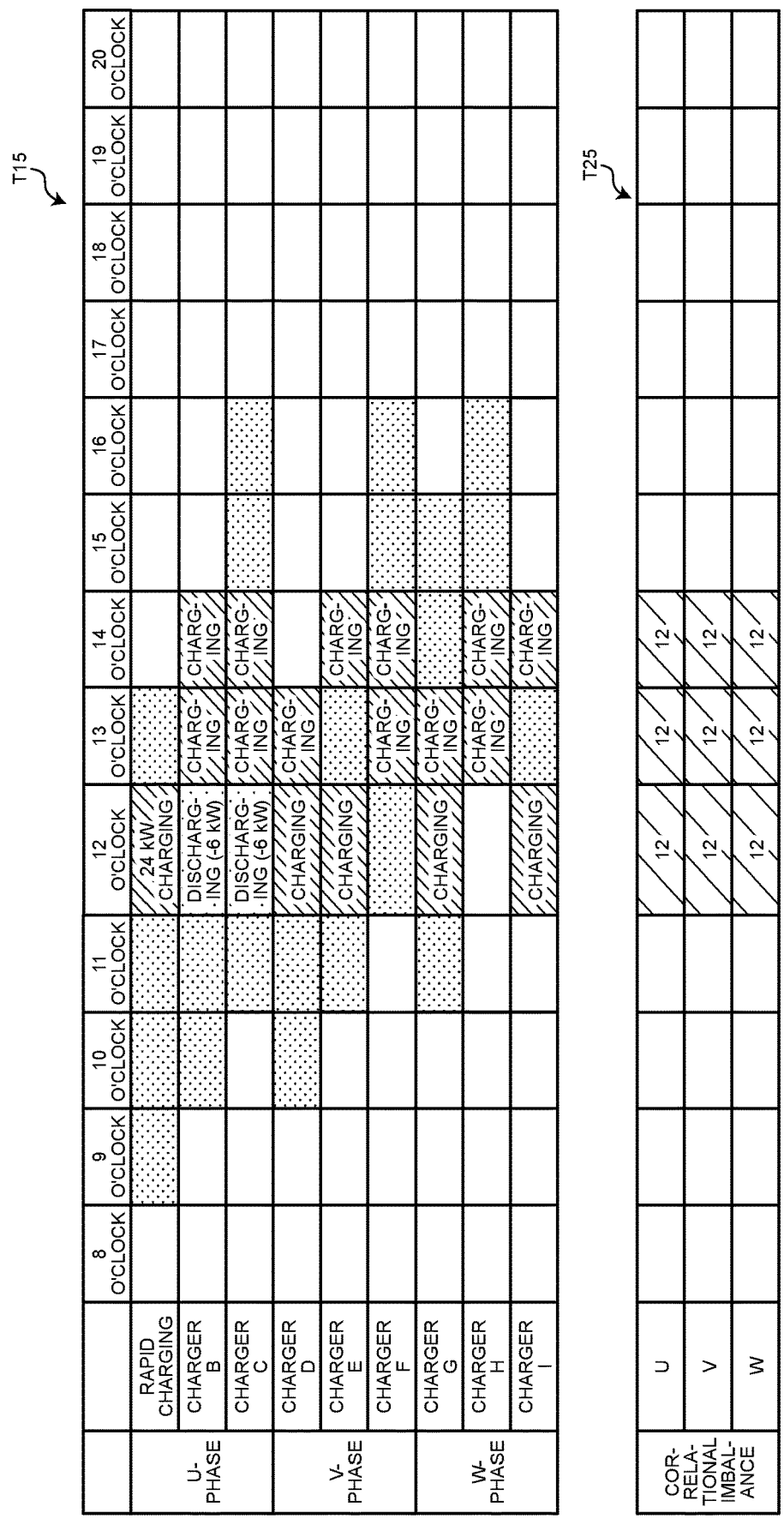
FIG. 6 is a diagram illustrating a state in which the charging control device according to the fourth modification controls the charging start time and the charging end time of each charger.

FIG. 6 is a diagram illustrating a state in which the charging control device according to the fourth modification controls the charging start time and the charging end time of each charger. As shown in the table T15 of FIG. 6, the charger A is capable of rapid charging and charges 24 kW per an hour. In this case, by making the charger B and C discharge from the battery by 6 kW, the three-phase alternating current becomes balanced as shown in the table T25 of FIG. 6, and it is possible to prevent the correlated unbalanced occurs.

Thus, when an excessive current flows in one phase such as rapid charging, it may prevent the occurrence of correlation imbalance by discharging from the other chargers of the same phase.

According to the present disclosure, it is possible to realize a charge control device that is able to prevent the correlation unbalance from occurring when charging a vehicle having a battery.

Further effects and variations may be readily derived by one skilled in the art. Thus, the broader aspects of the disclosure are not limited to the particular details and representative embodiments described and represented above.

Accordingly, various modifications are possible without departing from the spirit or scope of the overall inventive concept defined by the appended claims and their equivalents.

What is claimed is:

1. A charge control device comprising
a processor configured to:
acquire a delivery scheduled time of a vehicle and an amount of charge of a rechargeable battery when the vehicle including the rechargeable battery is connected to any one of a plurality of chargers of a single phase, each of the plurality of chargers being connected to each phase of the three-phase alternating current; and
control the any one of the plurality of chargers such that the three-phase alternating current is balanced according to the delivery scheduled time and the amount of charge.

2. The charge control device according to claim 1, wherein the processor is configured to determine a charging start time and a charging end time of the any one of the plurality of chargers according to the delivery scheduled time and the amount of charge.

3. The charge control device according to claim 1, wherein the processor is configured to:
determine the any one of the plurality of chargers to which the vehicle is connected such that the three-phase alternating current is balanced; and
guide the vehicle to the determined charger.

4. The charge control device according to claim 1, further comprising a communication unit configured to communicate with the vehicle,
wherein when the communication unit receives a request of connecting to the any one of the plurality of chargers from the vehicle, the processor is configured to acquire the amount of charge from the vehicle that has output the request.

5. The charge control device according to claim 1, wherein the processor is configured to control charging and discharging of the any one of the plurality of chargers to balance the three-phase alternating current according to the delivery scheduled time and the amount of charge.

* * * * *